United States Patent [19]

Chiba

[11] Patent Number: 5,028,754
[45] Date of Patent: Jul. 2, 1991

[54] COOKING HOOD FOR MAKING SPONGE CAKE

[76] Inventor: Machiko Chiba, 26-6, Kawadaira 3-chome, Sendai-shi, Miyagi, Japan

[21] Appl. No.: 343,548

[22] Filed: Apr. 21, 1989

[30] Foreign Application Priority Data

Feb. 15, 1989 [JP] Japan .................................. 1-35788

[51] Int. Cl.⁵ ............................................. H05B 6/80
[52] U.S. Cl. ...................... 219/10.55 E; 99/DIG. 14; 219/10.55 F; 426/243
[58] Field of Search ................... 219/10.55 E, 10.55 F; 99/DIG. 14, 451; 426/107, 241, 243, 234

[56] References Cited

U.S. PATENT DOCUMENTS 4,140,887 2/1979 Sutton et al. ................. 219/10.55 E Primary Examiner—Philip H. Leung
Attorney, Agent, or Firm—Wenderoth, Lind & Ponack

[57] ABSTRACT

A cooking hood used in making a cake in a microwave oven has a peripheral wall and a top wall formed with a center hole similar in shape to the top wall itself and is adapted to be put over a cake mold containing dough for a cake. The cake mold containing the dough and covered with the hood is put in a microwave oven to heat the dough to form a cake. The center hole is of such a size that the steam rising from the dough being heated will be released gradually through the hole so that the cake will be baked uniformly from the inside to the outside. The dough is made by kneading whipped egg, sugar, sifted flour, a fat such as margarine and water or milk with a whipper. The content of the water or milk should be larger by about 20 percent than when baking a cake of the same size in a gas or electric oven. The weight ratio of the water or milk to the flour should be about 55 percent.

1 Claim, 1 Drawing Sheet

COOKING HOOD FOR MAKING SPONGE CAKE

BACKGROUND OF THE INVENTION

The present invention relates to a cooking hood used in making a cake in a microwave oven and a method for making a sponge cake by use of the cooking hood.

A microwave oven is used to heat and cook a foodstuff by the frictional heat generated when the microwaves emitted from the oven act on the moisture in the food. Because foods can be cooked more quickly with a microwave oven than with any other cooking means, an increasing number of people now use it.

One problem with a microwave oven is that the food in the oven is more difficult to heat at its central portion than at its peripheral portion. This is because a microwave oven has such a structure that the microwave density is the lowest at the central portion. Most of the microwaves tend to be absorbed in the moisture present near the periphery of the material to be cooked and thus are prevented from penetrating deep into the material. Thus, the peripheral portion tends to be heated sufficiently before the heat generated at the peripheral portion is transmitted to the central portion.

Because of the abovesaid problem, the use of a microwave oven has heretofore been limited to defrosting, reheating and some applications in which the food is not likely to undergo a change of taste even if heated unevenly.

But, because of the advantage of microwave ovens in that foods can be cooked quickly and offhandedly, various methods have been proposed to solve the abovesaid problem not only by manufacturers of microwave ovens but also by professional cooks.

As described above, a food is heated in a microwave oven by the heat generated by friction between the particles in the food. Thus, when baking a cake in a microwave oven, for example, it is necessary that its dough contains more moisture than when baking a cake in a gas or electric oven.

Although the heat transfer coefficient may increase if the dough contains a large amount of water, the moisture in the dough near its periphery will absorb the microwaves actively, thus decreasing the microwave density in the central portion. This will cause the peripheral portion to be heated quickly and the central portion to be heated much more slowly, widening the difference in temperature between the peripheral portion and the core portion. This means that even when the dough is heated to such an extent that its peripheral portion is well-done, its core portion is still half-done, whereas when the dough is heated until the core portion is well-done, the peripheral portion has been overdone and has hardened.

It has been a common practice to form a center hole in the dough (or shape the dough into a doughnut) to prevent this problem. But a sponge cake having such a center hole could not be used as the base for a decorated cake.

If the water content of dough is increased to a given level, the heat transfer coefficient will increase to such an extent that the core portion and the peripheral portion will be heated substantially uniformly in spite of the difference of microwave density therebetween. But because the gluten in the dough can absorb only up to 60-65 per cent of moisture, any excess water in the dough will make the dough sticky. The stickiness of the dough will disappear if heated for a prolonged period of time. But the cake thus made will be less tasty. The optimum heating time in a microwave oven is said to be 4 minutes at 500 watts or 3 minutes and 50 seconds at 600 watts. These values vary more or less with the oldness of the oven and the length of the power cord.

A cake-making powdery material is now commercially available which contains flour, sugar, egg and the like in a mixed state and which is adapted to be cooked in a microwave oven. According to its cooking directions, water (or milk) has to be added by as much as 60 per cent by weight of the material. The cake made from dough containing such a large amount of water or milk cannot be tasty.

Another proposed cooking method teaches to cover cake dough nearly hermetically with a hood, sheet or cloth to prevent heat dissipation and thus improve the heating efficiency. But with this method, the dough will be baked as if in a casserole, and the resulting food would not deserve to be called a cake.

SUMMARY OF THE INVENTION

It is an object of the present invention to provide a device and method which make it possible to uniformly heat dough for a cake in a microwave oven.

In accordance with one aspect of the present invention, there is provided a cooking hood for baking a cake in a microwave oven and adapted to be put over a cake mold containing dough and placed together with the cake mold in a microwave oven, the cooking hood comprising a peripheral wall and a top wall formed in the center thereof with a hole similar in shape to the top wall, the hood being of such a size that the top wall and the peripheral wall will not touch the cake mold when the hood is put over the cake mold.

In accordance with another aspect of the present invention, there is provided a method for making a cake in a microwave oven, comprising the steps of whipping egg, adding sugar to the whipped egg, further whipping the mixture, adding thereto sifted flour together with a fat such as margarine and water or milk, the amount of water or milk being larger by approximately 20 per cent than when baking a cake of the same size in a gas or electric oven, kneading the ingredients into a dough by use of a whipper so that all of the ingredients will be distributed uniformly in the dough, pouring the dough into a cake mold, putting the cake mold in a microwave oven, putting the cooking hood as claimed in claim 1 over the cake mold, and heating the dough to form a cake in the microwave oven.

The hood should be analogous in shape to the cake mold and may be in the shape of a bowl, a truncated cone, a truncated pyramid or the like. It should be made of a material having a high degree of permeability to microwaves. Such a material includes a plastic such as polypropylene or polycarbonate, a ceramics or a cardboard material. If made of a plastic, its thickness should be 0.1 mm-5 mm. A translucent plastic is preferable to a colored (e.g. white) one and a transparent one is most preferable.

The area of the hole formed in the center of the hood should be determined through experiments, taking into account the size of the cake mold and the water content of the dough.

The abovesaid gap is necessary to reduce the sweating on the inner surface of the hood during heating and thus prevent drops of water from falling into the cake mold. The size of the gap should be determined so that the hood will scarcely or not at all sweat on its inner surface during heating.

According to the present invention, the amount of water or milk added to the cake material should be about 20 per cent greater than when baking a cake of the same size in an electric or gas oven. The weight ratio of water or milk to flour should be about 55 per cent. These values may vary more or less with the size of the hole in the hood and the thickness of the dough and the like and should be determined through experiments. When baking a cake in a gas oven or an electric oven, the weight ratio of water or milk to flour is ordinarily set at about 46 per cent. This means that about 20 per cent more water or milk is used in the present invention to make a cake of the same size.

The ingredients for the dough such as whipped egg and flour should be kneaded with a whipper to mix them thoroughly and to allow the milk (water) to be uniformly mixed and absorbed in the flour, thus yielding an appropriate amount of gluten. Also, since the water is uniformly distributed throughout the dough, it can be heated efficiently and uniformly. A manually operable whipper is preferable.

If the ingredients are kneaded with a rubber scraper in such a conventional manner that the scraper cuts into the material, the materials, especially milk (or water), could not be distributed uniformly. This will make it difficult to yield a suitable amount of gluten in the dough and to uniformly heat the dough in a microwave oven.

The dough for a cake prepared according to the present invention is heated in a microwave oven by the action of the microwaves. During the first stage of heating, the peripheral portion of the dough tends to be heated more quickly than the core portion. As the peripheral portion is heated, steam will rise from the dough and stay in the hood. The steam will serve to prevent heat dissipation and thus enhance heat transfer from the outside to the inside of the dough.

Since the steam in the hood is gradually released through its center hole, the hood will not be saturated with steam. Further the water drops condensed on the inner surface of the hood will be guided down along the hood surface, thus preventing the dough from being wetted with water drops.

Since the center hole formed in the top surface of the hood is similar in shape to the top surface itself, the density of steam will be uniform along the edge defining the center hole. Thus the cake will be heated uniformly with respect to its circumferential direction. Since the steam is released through the center hole gradually, the cake can be heated without being steamed.

Also, since the steam is released through the center hole in the hood, it will be distributed in the hood in such a manner that its density decreases gradually toward the axis of the hood. This means that the steam serves to absorb more microwaves emitted toward the peripheral portion than those emitted toward the core portion of the dough. This action of steam is believed to serve the purpose of heating the dough uniformly.

Other features and objects of the present invention will become apparent from the following description taken with reference to the accompanying drawings, in which:

DETAILED DESCRIPTION OF THE PREFERRED EMBODIMENT

Cake dough is made from the following ingredients in accordance with the present invention.
Soft flour: 110 grams,
Vegetable margarine: 20–30 grams,
Eggs (large size): 2
Milk: 60 cc,
Baking powder: 5 cc (one small spoonful),
Granulated sugar: 90 grams The ingredients have to be weighed out precisely. The flour and the baking powder are mixed together and are sifted three times from a height of 30 cm. The margarine is heated in a microwave oven for 20–30 seconds until it assumes a fluid state. If heated excessively, it will cause the dough to deflate when kneading with flour. Butter may be substituted for margarine.

Soft flour, baking powder and eggs have to be fresh. Soft flour which has been around for more than a rainy season should not be used. The freshness of an egg can be judged from the roundness of its yolk when it is dropped onto a flat surface. The rounder the yolk, the fresher the egg is.

Cake dough a is made from the above-described ingredients in the following manner.

(1) The egg is dropped onto a stainless bowl having moisture removed beforehand from its inner surface and is whipped for about one minute with an electric handheld mixer. The granulated sugar is added to the whipped egg. The egg is further whipped with a stronger force than before for 2–3.5 minutes while keeping the bowl in hot water until the color of the egg turns pure white or until its volume increases to three times the original volume. Then the bowl is taken out of the hot water and the egg is further whipped until the bowl cools down.

Care must be taken to leave no moisture on the inner surface of the bowl. Even a drop of water might prevent the egg from being sufficiently whipped. The temperature of water used to heat the bowl during whipping should fairly lower than 100° C. and preferably be around 60° C.

(2) The flour, milk and margarine are added to the thus whipped egg in this order. The ingredients are then kneaded by use of a manual whipper (i.e. a whisk having wires in the shape of bowling pins) for about 30 seconds. They have to be kneaded sufficiently so that they will be distributed uniformly. Care must be taken that the margarine does not settle on the bottom of the bowl. Fine-grained cake dough will be made by sufficiently kneading the ingredients with the whipper.

The dough a thus made is then baked in a microwave oven in the following manner.

Figure 1:
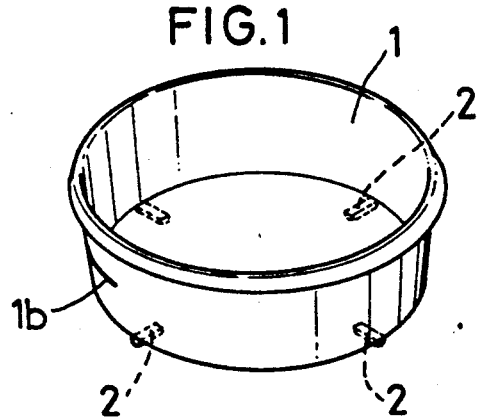
FIGS. 1 and 2 are perspective views of two different examples of cake molds according to the present invention.

(1) As shown in FIG. 1, a cake mold for use with a microwave oven for an ordinary household is typically 17–18 cm in diameter and 7–7.5 cm high. Such a cake mold 1 should have a diameter that gradually increases toward its top opening so that the moisture which comes out of the dough a during baking will be smoothly discharged from the mold, thus preventing the sweating of the mold. This will reduce the possibility of water falling in drops onto the dough a. The cake mold 1 should preferably be formed on its bottom with ribs 2 at equal angular intervals. The ribs 2 serve to enhance heat dissipation and cool down the bottom of the mold 1 which tends to be heated up quickly in the microwave oven. The plurality of ribs 2 may be replaced with an annular rib.

Figure 2:
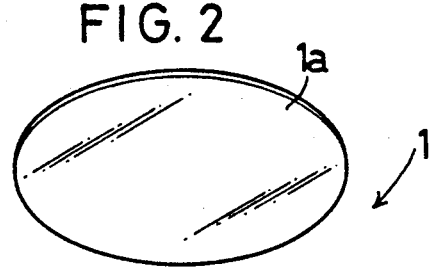

As shown in FIG. 2, the cake mold 1 may have an opening in the bottom there of and which opening could be closed by a plate 1a. With this arrangement, the baked cake could be easily taken out of the mold 1 together with the plate 1a by tapping the plate.

The mold 1 should preferably be provided with a mark 1b on the outer periphery at a position about 3.5 cm from the bottom. The dough a should be whipped to such an extent as to reach the height of the mark 1b when put in the mold 1.

Figure 3:
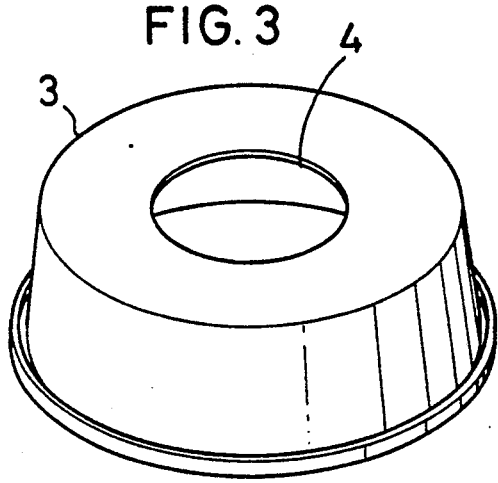
FIG. 3 is a perspective view of the cooking hood according to the present invention.
Figure 4:
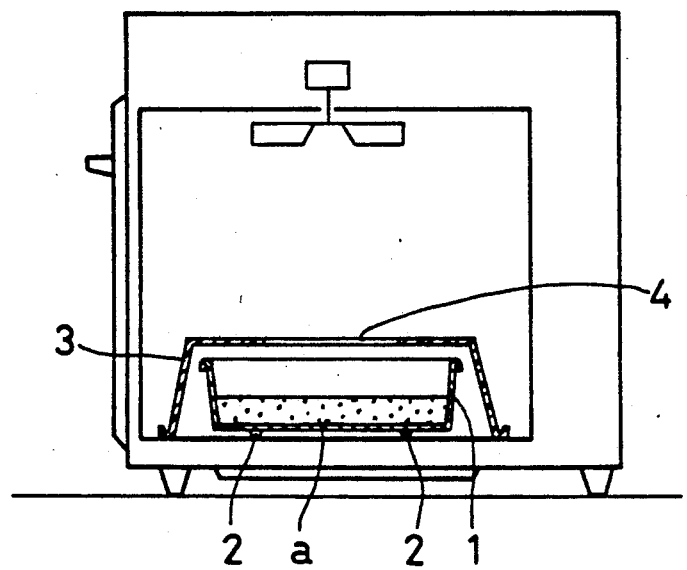
FIG. 4 is a view showing how a cake is baked in a microwave oven.

(2) As shown in FIG. 3, the hood 3 for covering the mold 1 has a bottom diameter of 22-24 cm, a top diameter of 21 cm and a height of 7.5-8 cm and is formed in its top wall with a center hole 4, 10 cm in diameter.

The hood 3 of this size is intended for use with the mold 1 of the aforementioned size (17-18 cm in diameter). The size of the hood 3 should be proportional the size of the mold 1. But it has to be high enough so as to not touch the dough a when the dough expands in the mold.

The cake mold 1 and the hood 3 should have a thickness of 2 mm and be made of heat-resisting polypropylene capable of resisting a temperature of more than 120° C. The cake mold 1 should preferably be transparent rather than colored (e.g. white) as with the hood 3.

(3) Now it will be described as to how the dough a is baked in microwave oven by use of the cake mold 1 and the hood 3. A heat-resisting sheet is laid under the cake mold 1. The sheet should be just as large as the bottom of the cake mold 1. The dough a is poured into the mold 1. The mold 1 containing the dough is dropped three times from a height of about 10 cm to expel the air in the dough a.

When the surface of the dough frames smooth and flat, the mold 1 containing the dough is put in a microwave oven and the hood 3 is put over the mold. The dough is heated for four minutes at 500 watts or for three minutes and 50 seconds at 600 watts. The dough a will thus be baked brown, soft and full.

The cake thus made is taken out of the oven and placed upside down on a wooden cutting board. The sheet has to be peeled off soon thereafter. The wooden cutting board is preferable because it absorbs water. The cake must not be cooled in a refrigerator but should be cooled in an airy atmosphere. After the cake has cooled down to the core, it may be decorated with e.g. whipped cream.

Now the cake is ready to be served But if it is stored in a refrigerator overnight, while covered with the hood 3 having its hole closed with a suitable means, it will ripen and taste better. The results of experiments showed that the cake remains spongy, and palatable for about one week unless the whipped cream goes bad.

It was also found that a tasty cake can be baked by use of a hood 3 having a bottom diameter of 18 cm, a top diameter of 17 cm and a height of 7 cm and formed in its top cover with a center hole 4 having a diameter of 6-7 cm. A hood 17 cm in diameter and 5 cm high was found out to yield the best results in baking a sponge cake.

The ingredients for the dough a are shown in the preferred embodiment by way of example. Ingredients of different kinds and weights may be used without deviating from the scope of the present invention.

The hood 3 according to the present invention is not limited to the use in the above-described cooking method but may be used in making a cake in a microwave oven from a commercially available premixed cake-making powder. The preferred weight ratio of milk to the cake-making powder should be approximately 55 per cent.

The dough a in a microwave oven without covering it with the hood 3 to check the effect of the hood 3. The temperatures of the dough at its peripheral portion and core portion after several minutes were 90° C. and 60° C., respectively. These figures show that it is very difficult to heat the dough uniformly without the hood 3.

What is claimed is:

1. A device for use in baking a cake in a microwave oven, said device comprising:
   a cake mold for accommodating dough therein; and
   a cooking hood comprising material having a high degree of permeability to microwaves and including a peripheral wall, and a top wall about which said peripheral wall extends to define the shape of the top wall,
   said hood being of such a size that said top wall and said peripheral wall will be out of contact with said cake mold when said cake mold is placed in a conventional microwave oven and said hood is disposed over said cake mold,
   said top wall defining a hole only through the center thereof of a shape complementary to the shape of said top wall so as to cause steam generated during the cooking of dough in said cake mold with microwaves to accumulate at a higher density adjacent the periphery of the dough than adjacent the core of the dough thereby facilitating uniform cooking of the dough owing to a greater absorption of microwaves by steam accumulated within the hood adjacent the periphery of the dough than by steam accumulated within the hood adjacent the core of the dough.

* * * * *